United States Patent [19]
Kus

[11] 3,820,211
[45] June 28, 1974

[54] TOOL BIT

[76] Inventor: Walter C. Kus, 4310 N.W. 12th Ct., Fort Lauderdale, Fla. 33313

[22] Filed: Jan. 22, 1973

[21] Appl. No.: 325,401

[52] U.S. Cl. ............................................. 29/101
[51] Int. Cl. ........................................... B26d 1/00
[58] Field of Search............ 29/101, 95, 96, 105 R, 29/105 A; 82/36, 37

[56] References Cited
UNITED STATES PATENTS

| | | | |
|---|---|---|---|
| 191,560 | 6/1877 | Beugler | 29/101 |
| 379,218 | 3/1888 | Hall | 29/101 |
| 1,550,088 | 8/1925 | McNeil | 29/105.1 |
| 3,140,627 | 7/1964 | Walby | 82/37 |

*Primary Examiner*—Leonidas Vlachos
*Attorney, Agent, or Firm*—Oltman and Flynn

[57] ABSTRACT

Lathe tool bit formed from stock having a curved and channeled configuration so that when given a simple grind or re-grind forms a lathe tool having the machining characteristics of a skillfully and substantially optimally shaped lathe tool, and one which cuts equally well toward or away from the headstock of the lathe, and is also easily adjustable to the height desired relative to the work being turned.

9 Claims, 5 Drawing Figures

3,820,211

TOOL BIT

BACKGROUND OF THE INVENTION

Lathe tools as commonly used are fairly difficult and expensive to grind to an ideal cutting shape. Several angles of grind are required to edge and shape a typical tool, and if the tool shape is optimized, the grind angles to form the edges and other angles must be carefully done. In unskilled hands, proper grinds are very difficult to achieve.

Further, the typical cutting tool when optimized is necessarily shaped for cutting best either away from or toward the head stock of the lathe. Thus, to cut in the most efficient manner in both directions with conventional tools, they must be either changed or reground to a different shape.

The most durable tools have a limited life before regrinding and resharpening is necessary, and such maintenance is especially expensive when optimum shapes are ground.

The importance of a properly ground tool in production is apparent when one realizes that high production rates of turned parts usually depend on high lathe speeds and feeds, both of which are directly dependent on how well tools are sharpened and maintained; and also certain surface finishes and tolerances can only be maintained with properly formed and sharpened tools when there is no play or looseness in the tool or its mounting and feeding equipment.

Common lathe tools are straight in shape other than the working tip, and typically are held in straight or angular arrangement to the work, and are consequently somewhat inconvenient to set at the proper height relative to the centerline of rotation of the work since several steps are required. This is in no way a serious problem, but constitutes something of a nuisance to the busy machinist. Tools that are not straight are not new however; in fact, curved and channeled tools easily adjustable for height that also provide side rake are known but are designed for cut-off work, are of the thin blade type, are necessarily ground to squared off tips, and are too narrow and otherwise generally unsuited for grinding to a shape suitable for long life lathe use for efficient turning operations, and facing.

SUMMARY OF THE INVENTION

The present invention overcomes the problems in earlier tools as this design is such that only two simple grinds are required to convert tool bit stock to an optimum or substantially optimum cutting tool. This is accomplished because the tool has an elongated body with a V-grooved top or face part, and other sides so that when two grinds of particular compound angles are made, a set of desired rake angles, cutting edge angles, relief angles, and clearance angles are resultingly formed. Further, the bottom being curved in the longer direction and being flat at right angles to it horizontally provides a bit that will set firmly in the conventional lathe tool post if desired requiring no special holder, and is readily adjustable in height relative to the work piece by simply moving the tool toward the centerline of the lathe or away from it within the tool post tool holding slot.

Accordingly, it is an object of the invention to provide a lathe bit stock form that is more easily ground into an idealized or substantially optimum shape than conventional bit stock.

Yet another object is to provide a tool bit stock configuration which may be easily ground into a truly satisfactory shape for lathe turning by unskilled or semi-skilled personnel with a minimum of training.

A further object is to provide a tool by simple grinding which cuts in a substantially optimum manner either toward or away from the lathe head stock with minimal adjustment and without special grinding for reversing the direction of cut.

Another object is to provide a tool bit which may be ground to optimum or near optimum shape with a minimum number of simple grinds.

A final object is to provide a lathe tool of the above type which is also more convenient to adjust in height than conventional tools.

ON THE DRAWINGS

AS SHOWN ON THE DRAWINGS

Figure 3:
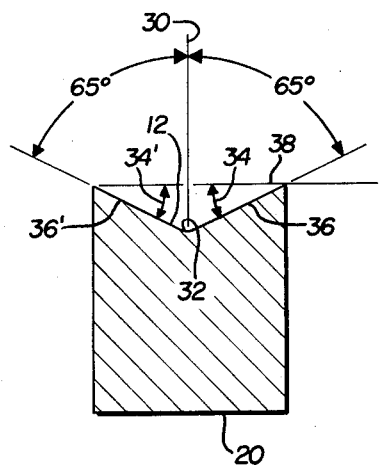
FIG. 3 is a sectional view of the tool.
Figure 4:
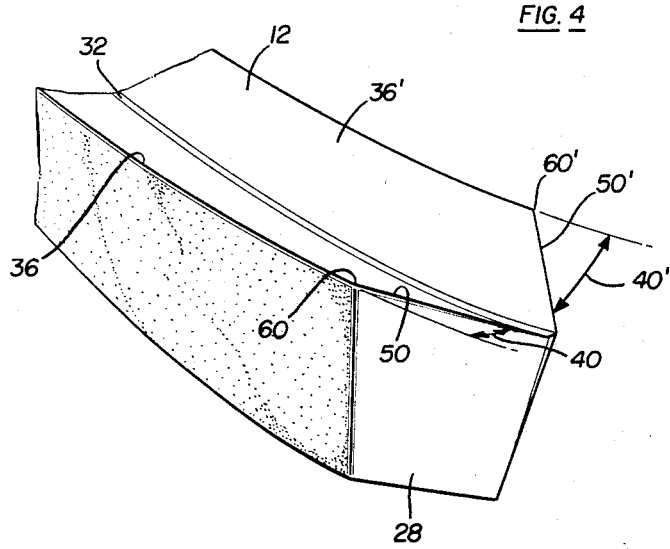
FIG. 4 is an enlarged view of the front end of the tool after grinding.
Figure 5:
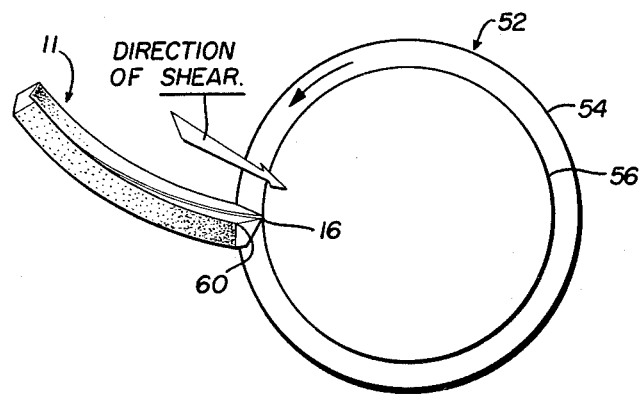
FIG. 5 is a view of the tool in use showing shearing and loading forces.

FIGS. 1 through 4 show the principal embodiment of the invention in various views to illustrate the geometry of the tool stock and the tool formed therefrom, and FIG. 5 shows the effect of the tool geometry in use on a lathe operation.

Figure 1:
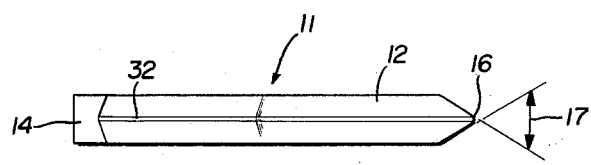
FIG. 1 is a top view of tool bit stock after grinding into a tool.

In FIG. 1 is shown a top view of the completed tool 11. On the top face is a V-channel 12 extending from the rear 14 to the front point 16. In the preferred embodiment, the included angle 17 of the point is 60° ± 5° which is also an excellent thread angle.

Figure 2:
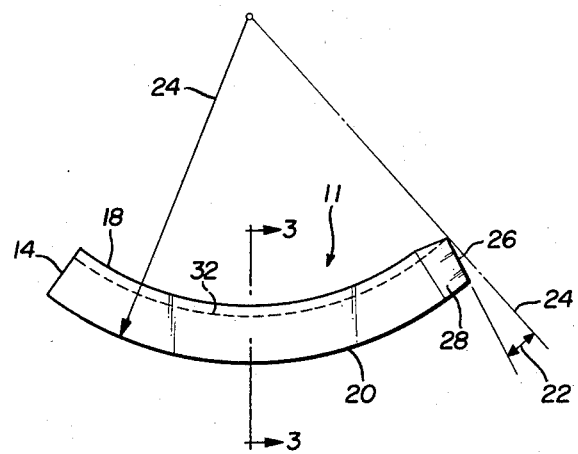
FIG. 2 is a side view of the tool of FIG. 1.

In FIG. 2 is shown a side view of the tool 11 showing the arc shape of the top face 18 and the bottom side 20 of the tool. The angle 22 is the front end clearance angle which generally corresponds to the angle measured between the radius of curvature 24 extended as shown and the front 26 of the tool after grinding. The end clearance angle is 10° to 30° and preferably 15° ± 5°. The ground flat region 28 is also shown in this view.

In the sectional view of FIG. 3 (taken at 3—3 of FIG. 2) the V-channel 12 of the top face is shown more clearly. In the preferred embodiment, the channel angle is 65° on each side of the centerline 30 to the face sides 36 and 36' or 130° ± 5° included.

The apex 32 may be fully angular but is more readily manufactured and is preferred with a small radius 32 as shown. This region also acts nicely as a chip breaker so that a special chip breaker does not have to be ground on the tool. The side rake angles 34 and 34' are the angles between the face sides 36 and 36' and a line 38 drawn horizontally. The angle 34 is therefore 90° − 65° = 25° in the preferred embodiment. For a tool of three-eighths inch sides and a five-sixteenths inch bottom with the above angles, a radius of 2⅜ inches (as shown in FIG. 2) is ideal for allowing easy height adjustment since moving the tool forward or backward along its long direction raises or lowers the tool point relative to the work centerline before the tool is tightened in the tool post for use.

In the preferred embodiment, the apex of the channel and the apex of the point are substantially coincident at the tip of the tool.

The effect of grinding two simple but geometrically compound angles on the front of the tool is shown in FIG. 4. A flat 28 is ground on one side, and a similar flat 28' (hidden from view) is ground on the other side which form the compound back rake angles 40 and 40' which are referred to as negative back rake angles in shop vernacular. The angles 40 and 40' are formed by the intersection of the planes of 28 and 28' with the planes of 36 and 36' of the V-channel 12. The compound angles 40 and 40' are approximately 30° and 30° measured relative to vertical flat sides and the tangent to the arc at the shoulder 60 and 60' of the tool.

After these two flats 28 and 28' are ground on the tool stock, the tool is now formed and complete as a result of this simple grinding with two side rake angles 34 and 34', two negative back rake angles 40 and 40', one end clearance angle 22, and two cutting edges 50 and 50' combining to make up a substantially optimum cutting tool shape. Because only two grinds are required, tool shaping is exceptionally fast and easy, inexpensive, and requires very little training or skill to perform.

The above negative back rake formed by the grind is most advantageous in actual use as will be apparent from consideration of FIG. 5. The tool 11 is advanced into the rotating bar 52 which is the work being turned, in order to turn down the larger diameter 54 to the smaller diameter 56 along its length. As the tool is advanced toward the headstock, for example, (into the page) the direction of shear has a component in the direction from the shoulder 60 of the tool to the tip or point 16 so that a reacting component of force results and is exerted partially horizontally against the tool tending to push it away from the work 52 and against the tool post (not shown) in which the tool is held. The force is further transmitted against the feed screws on the lathe carriage (not shown) and the carriage itself so that there is no looseness in the holding and feeding system which might vary the diameter of the work or cause a rough finish on it. The whole width of the cutting edge is effective, allowing fast feed. Cutting is a shearing action in the direction of the feed. The metal being removed forces the cutting edge of the tool away. The forcing away, as a result of the shearing action, as illustrated, keeps the cutting edge of the tool bit from being drawn into the metal itself resulting in consequent breakage of the tool bit. Also, there is less resistance to cutting so less heat is generated and no lubrication is required. The tool can be used for threading or cutoff as well as for turning.

Having thus described the present invention and the improvements resulting therefrom, I claim:

1. An elongated arc-shaped cutting tool having a longitudinally concave top, a longitudinally extended bottom and generally parallel and flat opposite sides, said tool having a longitudinal grooved channel in its concave top, said tool terminating at one end in a front edge that extends downward and rearward from said concave top at an acute end clearance angle to the radius of arcuate curvature of the latter at said end, said tool having oppositely diverging flat surfaces extending rearward from said front edge at opposite acute angles to said longitudinal channel in the top of the tool and making respective junctures with said opposite sides of the tool at shoulders spaced behind said front edge, said grooved channel in the top of the tool extending to said front edge and intersecting said upper ends of said flat surfaces from the respective shoulders to said front edge to provide respective cutting edges at the top, each of which extends at a negative back rake angle to the respective flat surface.

2. A tool according to claim 1, wherein said negative back rake angle at the top of each of said flat surfaces is substantially 30°.

3. A tool according to claim 1, wherein said end clearance angle is within the range from 10° to 30°.

4. A tool according to claim 1, wherein said diverging flat surfaces extend at an angle to each other of substantially 60° ± 5°.

5. A tool according to claim 4, wherein said negative back rake angle at the top of each of said flat surfaces is substantially 30°.

6. A tool according to claim 5, wherein said end clearance angle is within the range from 10° to 30°.

7. A tool according to claim 6, wherein said channel in the top is substantially V-shaped and has an included angle of substantially 130° ± 5°.

8. A tool according to claim 5, wherein said channel in the top is substantially V-shaped and has an included angle substantially 130° ± 5°.

9. A tool according to claim 1, wherein said channel in the top is substantially V-shaped and has an included angle of substantially 130° ± 5°.

* * * * *